United States Patent
Cull et al.

(10) Patent No.: US 7,465,079 B1
(45) Date of Patent: Dec. 16, 2008

(54) EXTENDED AVIONICS LCD BACKLIGHT

(75) Inventors: Brian D. Cull, Glendale, AZ (US); Elias S. Haim, Glendale, AZ (US)

(73) Assignee: Honeywell International Inc., Morristown, NJ (US)

(*) Notice: Subject to any disclaimer, the term of this patent is extended or adjusted under 35 U.S.C. 154(b) by 287 days.

(21) Appl. No.: 11/035,747

(22) Filed: Jan. 14, 2005

(51) Int. Cl.
*F21V 21/00* (2006.01)

(52) U.S. Cl. .................... 362/471; 362/27; 362/561

(58) Field of Classification Search ............ 362/470, 362/471, 27, 555, 558, 561; 345/58, 65
See application file for complete search history.

(56) References Cited

U.S. PATENT DOCUMENTS

| | | | | |
|---|---|---|---|---|
| 4,371,870 A | * | 2/1983 | Biferno | ............... 345/4 |
| 4,562,433 A | * | 12/1985 | Biferno | ............... 345/4 |
| 5,889,568 A | * | 3/1999 | Seraphim et al. | ........... 349/73 |
| 6,039,451 A | * | 3/2000 | Grave | ............ 362/29 |
| 6,841,947 B2 | * | 1/2005 | Berg-johansen | ........ 315/169.3 |
| 7,139,046 B2 | * | 11/2006 | Katahira | ........... 349/58 |
| 2002/0003592 A1 | * | 1/2002 | Hett et al. | ........... 349/58 |
| 2002/0118320 A1 | * | 8/2002 | Bayrle et al. | ........... 349/73 |
| 2003/0063456 A1 | * | 4/2003 | Katahira | ........... 362/27 |
| 2006/0146518 A1 | * | 7/2006 | Dubin et al. | ........... 362/106 |

* cited by examiner

*Primary Examiner*—John A Ward
(74) *Attorney, Agent, or Firm*—Ingrassia Fisher & Lorenz, P.C.

(57) ABSTRACT

An aircraft avionics display assembly comprises a first and second liquid crystal display, each operable to display avionics flight data in an aircraft. A backlight is operable to backlight both the first and second liquid crystal displays. In some embodiments, the backlight comprises a primary light source and a redundant light source, wherein the primary light source and the redundant light source are controlled by a common backlight controller.

14 Claims, 2 Drawing Sheets

EXTENDED AVIONICS LCD BACKLIGHT

FIELD OF THE INVENTION

The invention relates generally to backlighting liquid crystal display panels, and more specifically to an extended avionics liquid crystal display backlight.

BACKGROUND OF THE INVENTION

Traditionally, airplanes have incorporated a variety of instrument gauges to indicate various parameters of flight to a pilot. The most basic of these traditional instruments are four gauges arranged in a traditional "T", pattern, and include airspeed, attitude, altitude, and directional indicators. Other gauges such as climb and flight path deviation indicators are also common, and are usually positioned near the basic "T" instrument cluster.

As mechanical gauge technology has been replaced with electronic and computerized flight indicator displays, integration of several of these traditional data elements onto one screen has become common, and displays such as liquid crystal displays (LCDs) have been configured to show a wide variety of flight data on a relatively small number of LCD screens. These screens can vary from airplane type to airplane type, and even between individual airplanes depending on the sensors and navigational systems installed on each aircraft.

Because the airplanes must be equipped to fly in darkness, the LCD displays are traditionally backlit with a light that shines behind the portion of the display that produces the image. The formed image blocks a portion of the visible backlight, resulting in a formed image that is visible to the pilot and other flight crew members viewing the LCD instruments. Because it can be critically important for safe flight to make sure that the LCD instrument display remains lit during night flying, the backlights often consist of two or more separately powered light sources, so that if one fails the other can still provide light. The light sources themselves vary, and include cold cathode lights, fluorescent lights, electroluminescent panels, light-emitting diodes, and other such lighting technologies.

Further, because the LCD and backlight systems will be installed in an airplane, they must meet rigorous specifications for long life, and a wide variety of environmental and vibrational conditions. The optical specifications of each unit must also meet strict performance criteria to ensure legibility of critical flight data. The design of the LCD displays and backlight systems must take all this into account, resulting in a robust system that is often expensive, large, and heavy.

In configurations where multiple LCD displays are used, each display has its own backlight system and control electronics. The control electronics power the backlight system, control the brightness of the backlight, and control the operation of redundant or backup lighting systems. Because the cost, space, and weight required for multiple backlights and backlight control systems is not trivial in a crowded airplane cockpit, it is desirable to reduce the cost, space, and weight consumed by such systems.

SUMMARY OF THE INVENTION

The present invention provides in one embodiment an aircraft avionics display assembly comprising a first liquid crystal display and a second liquid crystal display, each operable to display avionics flight data in an aircraft. A backlight is operable to backlight both the first and second liquid crystal displays. In some further embodiments, the backlight comprises a primary light source and a redundant light source, wherein the primary light source and the redundant light source are controlled by a common backlight controller.

DETAILED DESCRIPTION

In the following detailed description of sample embodiments of the invention, reference is made to the accompanying drawings which form a part hereof, and in which is shown by way of illustration specific sample embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the spirit or scope of the present invention. The following detailed description is, therefore, not to be taken in a limiting sense, and the scope of the invention is defined only by the appended claims.

Figure 1:
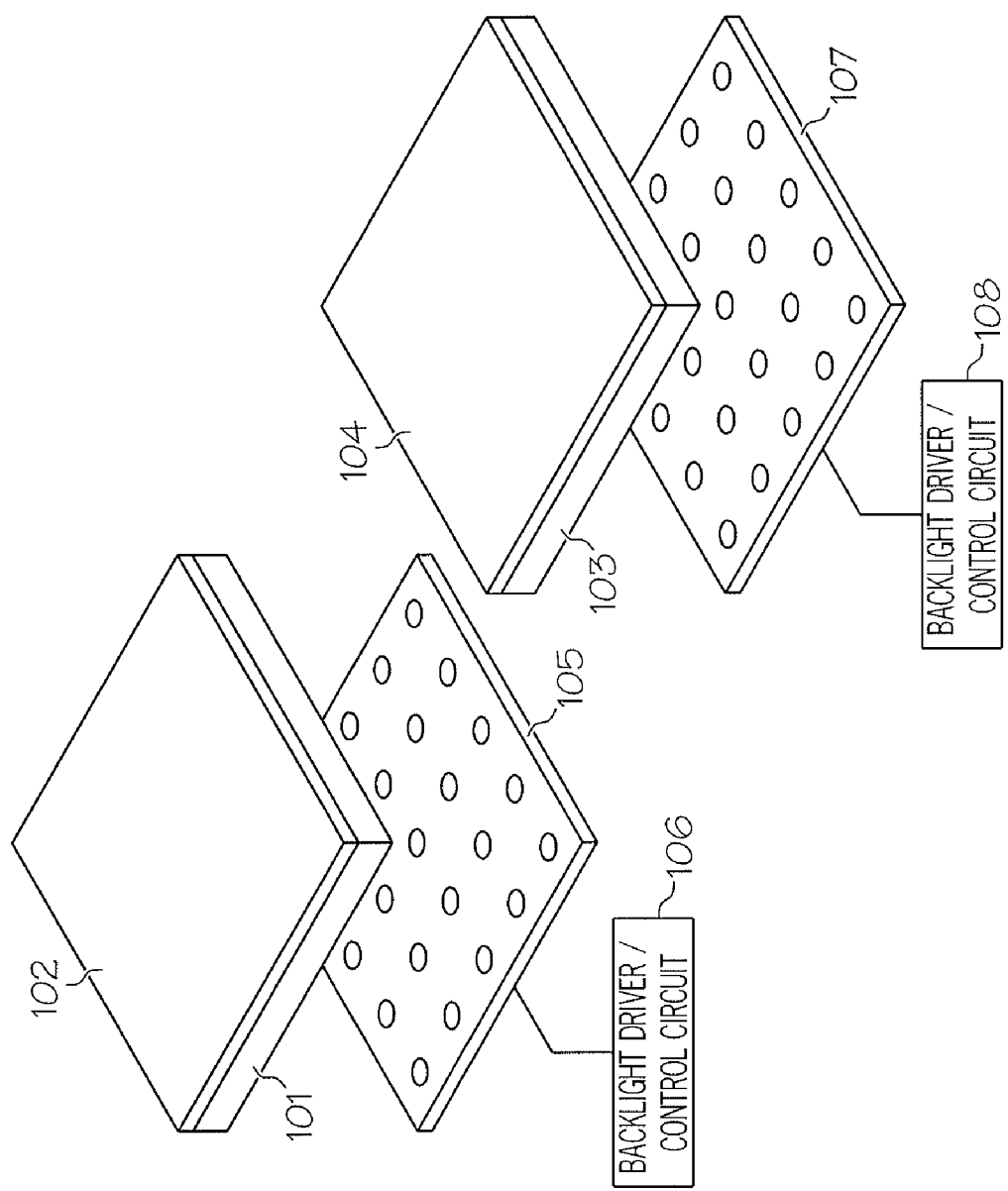
FIG. 1 shows an avionics display assembly comprising two liquid crystal display panels, each having a backlight, consistent with the prior art.

FIG. 1 shows a typical avionics display assembly having multiple display panels, consistent with the prior art. A liquid crystal display panel 101 is covered by a glass layer 102, and is used to display images and data relating to flight. This data commonly includes such things as airspeed, attitude, altitude, direction, rate of climb, flight path deviation, global positioning system (GPS) data, and mapping data. This data is presented to the pilot and other flight crew members via the display panel to aid them in operating the aircraft.

A second liquid crystal display panel 103 and glass layer 104 similarly comprise part of the avionics display assembly, and present more flight data to the flight crew. The first liquid crystal display is backlit by an LED backlight assembly 105, which is controlled by backlight drive circuit 106, while the second liquid crystal display panel is backlit by a second LED backlight assembly 107, which is controlled by backlight drive circuit 108. The prior art system therefore requires a separate backlight and backlight drive circuit or control assembly for each display assembly.

Figure 2:
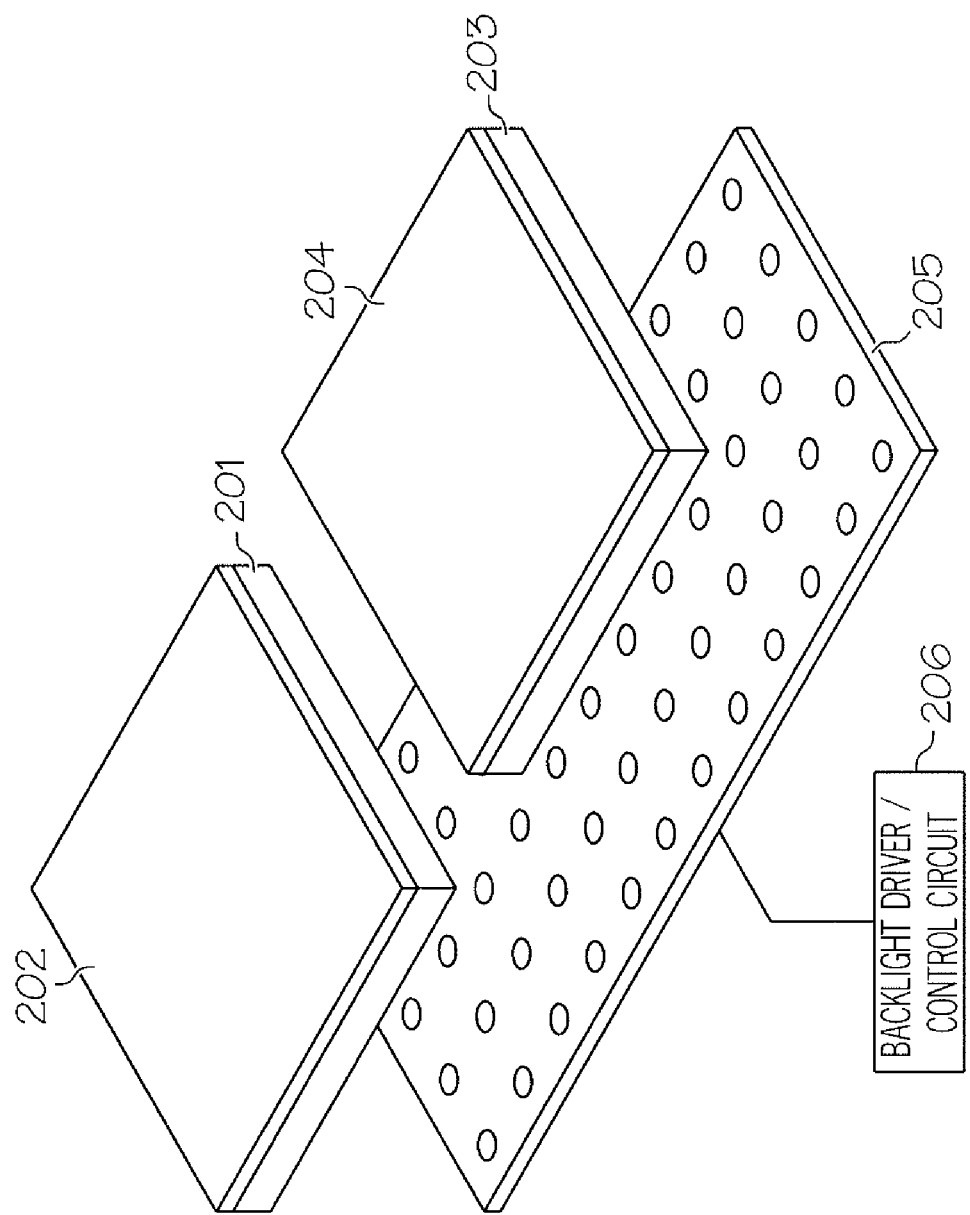
FIG. 2 shows an avionics display assembly comprising two liquid crystal display panels having a common backlight assembly, consistent with an embodiment of the present invention.

FIG. 2 illustrates how the present invention provides a reduction in the weight, cost, and physical space required by a system such as that of FIG. 1. A first LCD display 201 and its glass panel cover 202 are located adjacent to a second LCD display 203 and its glass panel cover 204. Both LCD displays 201 and 203 are configured such that they are illuminated by the same backlight assembly 205, which uses only a single backlight driver and control circuit 206. The backlight panel 205 as shown comprises a number of light-emitting diodes (LEDs), each of which is powered to produce light that backlights the LCD panels 201 and 203. If a single LED fails, the remaining LEDs will continue to illuminate the LCD panels and provide sufficient light to view the LCD panels until the failed LED is replaced.

Other embodiments of the invention will use light sources other than LEDs, such as electroluminescent panels, cold-cathode bulbs, fluorescent bulbs, or regular incandescent light bulbs. It is desired for purposes of fault tolerance that if a single light source fails, enough light will be produced by other light sources to adequately backlight the LCD panels so that they remain legibly visible to the flight crew. If electroluminescent panels are used, multiple panels may be layered or sandwiched on the backlight panel 205 to ensure that if one backlight light source fails another is available. Similarly, multiple fluorescent light bulbs, incandescent light bulbs, cold-cathode lamps, or light-emitting diodes are used in various embodiments to provide redundant light sources should a light source fail in operation.

The controller 206 of some embodiments is operable to control the amount of light produced by the backlight light source, such as by varying the voltage applied to the light source or by varying the number of light sources illuminated. In some further embodiments of the invention where multiple light sources are present such as for backup or redundant purposes, the backlight driver and controller circuit 206 is configured to light only certain backlight light sources, while not illuminating others. Should a light source fail, it can then be switched off and a replacement light source can be illuminated to compensate.

The operator in some further embodiments is able to adjust or control the amount of backlight, by providing a signal to the backlight driver and control circuit 206 such as by turning a dial connected to a potentiometer or other electrical device. The amount of backlight is then adjusted in response to the user's input, such as by varying the voltage applied to the light source or sources, or by selectively turning light sources on and off to vary the amount of illumination provided by the backlight panel 206.

The configuration shown in FIG. 2 is an improvement over the configuration of FIG. 1 in that it requires only a single backlight light source and a single backlight driver and control circuit, whereas the prior art avionics display system requires a separate backlight and backlight control circuit for each display. The present invention saves not only space by eliminating components common to both displays, but saves the cost of having to buy the extra components and saves the weight of incorporating the extra components into each display. Because the instrument panel of an aircraft is often densely packed with various instruments and communication devices, the reduction in space consumed an in wiring connections is significant. Also, each additional bit of weight added to an aircraft results in additional fuel consumed over the life of the aircraft, so the reduction in weight realized by elimination of redundant components in the present invention will result in a savings of fuel over the life of the aircraft.

The present invention as illustrated here shows how a single backlight assembly configured to illuminate two or more avionics displays can result in significant savings in terms of cost, space, and weight in an aircraft. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the claims, and the full scope of equivalents thereof.

The invention claimed is:

1. An aircraft avionics display assembly comprising:
   a first liquid crystal display operable to display avionics flight data in an aircraft;
   a second liquid crystal display operable to display avionics flight data in an aircraft;
   a single backlight comprising a primary light source and a redundant light source disposed on a common panel and operable to backlight both the first and second liquid crystal displays; and
   a common backlight controller in operable communication with the primary light source and the redundant light source, and operable to selectively illuminate one of the primary light source and the redundant light source,
   wherein the first and second liquid crystal displays are located adjacent to one another when mounted in an aircraft instrument panel.

2. The aircraft avionics display assembly of claim 1, wherein the single backlight comprises at least one fluorescent light.

3. The aircraft avionics display assembly of claim 1, wherein the single backlight comprises at least one electroluminescent panel.

4. The aircraft avionics display assembly of claim 1, wherein the single backlight comprises at least one cold-cathode light.

5. The aircraft avionics display of claim 1, further comprising at least one additional liquid crystal display operable to display avionics flight data, and configured such that the single backlight is operable to backlight the at least one additional display.

6. An aircraft avionics instrument cluster comprising:
   a first display operable to display avionics flight data in an aircraft;
   a second display operable to display avionics flight data in an aircraft; and
   a single backlight comprising a primary light source and a redundant light source disposed on a common panel and operable to backlight both the first and second liquid crystal displays; and
   a common backlight controller in operable communication with the primary light source and the redundant light source and operable to selectively illuminate one of the primary light source and the redundant light source,
   wherein the first and second displays are located adjacent to one another when mounted in an aircraft instrument panel.

7. The aircraft avionics instrument cluster of claim 6, wherein the single backlight comprises at least one fluorescent light.

8. The aircraft avionics instrument cluster of claim 6, wherein the single backlight comprises at least one electroluminescent panel.

9. The aircraft avionics instrument cluster of claim 6, wherein the single backlight comprises at least one cold-cathode light.

10. The aircraft avionics instrument cluster of claim 6, further comprising at least one additional display operable to display avionics flight data, and configured such that the single backlight is operable to backlight the at least one additional display.

11. A method of backlighting an avionics display assembly, comprising:
    illuminating a first backlight from a common backlight controller while not illuminating a redundant backlight that is disposed on a common panel with the first backlight, the first backlight operable to illuminate both a first and a second display panel, the first and second display panels operable to display avionics flight data and located adjacent to one another when mounted in an aircraft instrument panel; and selectively illuminating the redundant backlight from the common backlight controller while not illuminating the first backlight, the redundant backlight also operable to illuminate both the first and the second display panels.

12. The method of backlighting an avionics display assembly of claim 11, wherein at least the first backlight comprises at least one fluorescent light.

13. The method of backlighting an avionics display assembly of claim 11, wherein at least the first backlight comprises at least one electroluminescent panel.

14. The method of backlighting an avionics display assembly of claim 11, wherein at least the first backlight comprises at least one cold-cathode light.

\* \* \* \* \*